PHASE INSENSITIVE SYNCHRONOUSLY TUNED FILTER

Filed Sept. 16, 1954 2 Sheets-Sheet 1

INVENTOR
RICHARD M. RINGOEN
BY Marvin Moody
ATTORNEY

INVENTOR
RICHARD M. RINGOEN
BY Marvin Moody
ATTORNEY

United States Patent Office 2,752,491

Patented June 26, 1956

2,752,491

PHASE INSENSITIVE SYNCHRONOUSLY TUNED FILTER

Richard M. Ringoen, Cedar Rapids, Iowa, assignor to Collins Radio Company, Cedar Rapids, Iowa, a corporation of Iowa Application September 16, 1954, Serial No. 456,580

11 Claims. (Cl. 250—27)

This invention relates generally to synchronously tuned filters and particularly to means for maintaining the output of a synchronously tuned filter circuit insensitive to phase shift between the signal input and the synchronous switching means of the filter.

Synchronous filters are used where the exact frequency of a signal is known and a very narrow bandpass is required, particularly at low frequencies. For example, it is often required that an antenna be directionally aligned with an incoming ultra high frequency signal which may be very weak. The antenna may be nutated, as is well known, to provide an error signal which has a modulation amplitude that is proportional to the misalignment of the antenna.

The nutation frequency is precisely known, since it is determined by the motor which rotates the antenna to obtain nutation. It is the amplitude that is unknown and must be determined.

The signal will generally be a very small voltage since it is dependent on the strength of a received radio wave or solar radiation. Accordingly, noise and unwanted signals easily disturb it; and for this reason the signal must be passed through a very narrow bandpass filter to separate it from the noise and unwanted signals in the regions adjacent the bandpass. It has been particularly difficult to obtain a narrow bandpass in the subaudio regions where nutation frequencies often exist. Passive filters which provide very narrow bandpasses are either impossible or very impractical at these frequencies. A model of the invention had a bandpass of 0.03 cycle per second about a center frequency of 24 cycles per second with an adjacent band attenuation of 46 decibels. The adjacent channel attenuation may be multiplied by cascading.

Some types of synchronous filters are known, and one type is shown and described in application No. 223,236 filed April 27, 1951, now abandoned, and assigned to applicant's assignor. That application is now abandoned but is continued by a copending divisional application No. 383,561 filed September 14, 1953, now abandoned. Briefly, that synchronous filter, shown in Figure 1 to assist in understanding the invention in this application, comprises a large resistor which is alternately switched in series with a pair of capacitors by a single-pole double-throw switching device, which may be an apparatus commonly known as a chopper. The switching device operates in synchronism with the frequency of the incoming signal, which is applied across the resistor and alternate capacitors. The output load is alternately connected across the capacitors by the switching means; and a high impedance load is required.

Filtering action is obtained by synchronously switching the positive and negative loops (half-cycles) of the signal into the respective capacitors; and direct voltages of opposite polarity build up in the respective capacitors with amplitudes proportional to the signal. Non-synchronous signals and noise both charge and discharge a single capacitor during a single switching operation to provide substantially no net charge and hence do not affect the output. A difficulty with this type of synchronous filter is that the switching frequency must be exactly in phase as well as synchronous with the signal frequency to provide maximum output for a given input signal. The reason for the phase sensitivity is that the chopper must switch between the capacitors at the precise moment that the signal changes from a loop of one polarity to a loop of opposite polarity. The filter becomes ineffective when the phase between signal and switching means becomes ninety degrees. Hence, a limitation to the practical operation of the synchronous filter utilizing a single switching means is that phase shift is caused by stray inductance or capacitance in the chopper circuit.

It is accordingly the primary object of this invention to provide a synchronous filter circuit which maintains an output unaffected by variation in phase between the input signal and switching frequencies.

It is another object of this invention to provide a synchronous filter circuit which is stable in spite of phase shift between the signal and switching frequencies and provides a high Q circuit with a very narrow bandpass and large adjacent band attenuation at subaudio center frequencies. The invention, however, is by no means limited to subaudio frequencies, but may be used even at radio frequencies with suitable switching devices.

Figure 1 is a filter circuit of the type described above;

Figures 2A, B, and C are waveforms corresponding tn an inphase condition of operation for the circuit of Figure 1;

Figures 3A, B, and C are waveforms corresponding to a ninety-degree-phase condition of operation for the circuit of Figure 1;

Figure 1:
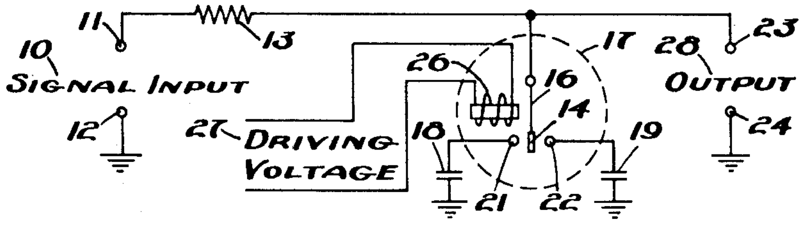

Figure 1 illustrates one of the synchronous filter circuits described in above cited application No. 223,236, now abandoned, and is used herein as a foundation for understanding the basic operation of the present invention, which is concerned with the phase shift characteristics of synchronous filters. In Figure 1, a signal input 10, which is to be filtered, is provided at input terminals 11 and 12. Terminal 12 is connected to ground and terminal 11 is connected to one end of a resistor 13 of large value. A chopper 17 has an armature contact 14 fixed to its armature 16 which is connected to the other side of resistor 13, and a pair of capacitors 18 and 19 are connected between ground and the chopper's fixed contacts 21 and 22, respectively. A pair of output terminals 23 and 24 are connected to armature 16 and ground, respectively; and a very high impedance load (not shown) is connected between the terminals. Chopper 17 has a driving coil 26 which receives an input voltage 27 generally obtained from a source other than the source of signal, but voltage 27 is synchronized in frequency with the signal 10. An example of the synchronized voltage is that obtained in an antenna nutation system from a generator driven by the shaft of a nutating motor which also provides the frequency of the signal.

Although signal 10 and chopper driving voltage 27 have the same frequency, since they are synchronously obtained, they may nevertheless have any phase relationship. The phase in the filter of Figure 1 is critical; and for a particular amplitude of signal input 10, the amplitude of the output 28 of the filter will vary by the cosine of the phase angle from a maximum when the voltages are in phase to essentially zero when they are ninety degrees out of phase.

Figure 2:
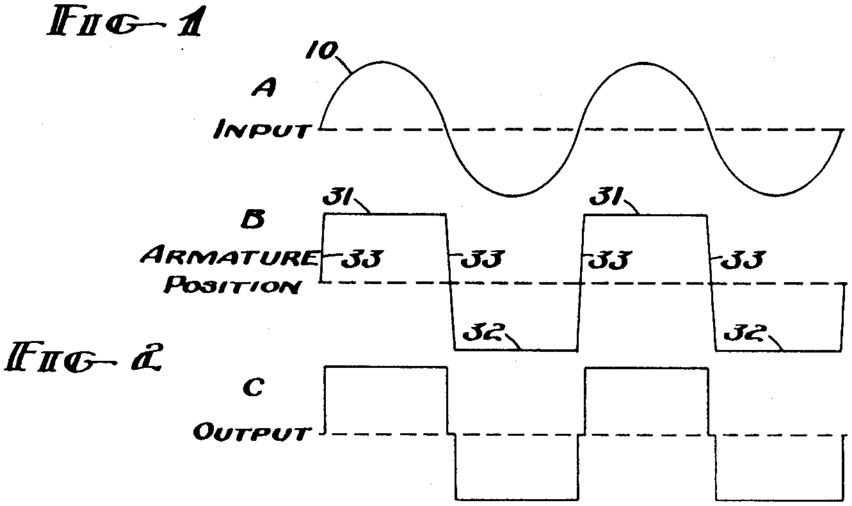

Figures 2A, B, and C illustrate the relationship between signal input voltage 10 and signal output voltage 28 for this filter when armature 16 vibrates in phase with signal input 10. Figure 2A represents signal input 10 which is generally sinusoidal, although it may be modulated at a very low frequency. Figure 2B represents the position of armature 16 when it operates in phase with signal input 10. Here, armature contact 14 engages contact 21 during periods 31, shown as the upper horizontal lines, and engages contact 22 during periods 32, represented by the lower horizontal lines. Armature 16 switches as the signal goes through zero, which is represented by lines 33. Hence during one in-phase condition armature 16 connects capacitor 18 to input 10 during signal loops of positive polarity; and it connects the other capacitor 19 during signal loops of negative polarity. Because the time constant of resistor 13 and alternate capacitors 18 and 19 is large compared to a cycle of signal, capacitor 18 is charged to a positive direct voltage that is proportional to signal amplitude, and the other capacitor 19 is charged to a negative direct voltage that is also proportional to signal amplitude. The resultant output 28 is shown in Figure 2C and is applied to a high impedance load (not shown in Figure 1) that will not substantially discharge the capacitors during a cycle of signal. Therefore, the output is essentially a square wave.

Figure 3:
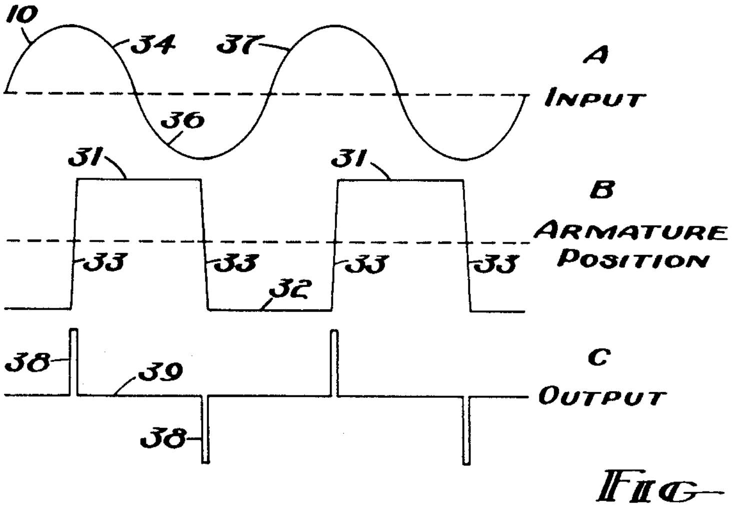

On the other hand, Figures 3A, B, and C illustrate the condition where armature switching (Figure 3B) is ninety degrees out of phase with the signal (Figure 3A). Figure 3B uses the same reference designation as Figure 2B, and armature 16 now switches between capacitors 18 and 19 at signal peaks instead of at signal zero points. Hence during time 31, capacitor 18 is charged by substantially one half of a positive loop 34 and is discharged by the immediately following one half of a negative loop 36; and hence obtains a net charge of substantially zero. Likewise, the other capacitor 19 is charged by the remaining half of the negative loop 36 and is discharged by one half of the immediately following positive loop 37 for a net charge of substantially zero. The resultant output 28 is shown in Figure 3C. The pips 38 occur during the open circuited switching period 33, which has very short duration and does not appreciably affect the output. Therefore, almost no output (line 39) is available from the filter of Figure 1 when a ninety-degree-phase condition occurs, although perfect synchronization is maintained between the signal frequency and switching frequency.

The filtering action of the circuit of Figure 1 may be visualized by assuming that in addition to the synchronous signal input there is an unwanted voltage of slightly different frequency also applied at the input. It is apparent that only rarely will armature 16 switch contacts as the unwanted voltage goes through zero due to lack of synchronization between the unwanted signal and the switching frequency. Hence, the unwanted voltage, for the most part, will be charging and discharging the capacitors during a single switching cycle to leave almost no net charge on the capacitors and hence will have very little effect on the output of the circuit. Therefore, when the filter of Figure 1 operates with an in-phase condition, it will provide a maximum output proportional to the synchronous signal, and unwanted frequencies will have little effect; but when it operates ninety degrees out of phase, it does not provide essentially any output.

The invention remedies the phase sensitive conditions of the prior filter and utilizes among other components two synchronous filter circuits of the type described in connection with Figure 1. The invention includes two double-throw single-pole switching devices which, very important in this invention, are driven ninety degrees out of phase with each other. I have discovered that if a ninety degree phase relationship is provided between the two switches, the phase between the input signal and the switches is no longer of any consequence. Furthermore, the two filters of the type in Figure 1 have their input terminals connected together in the invention but have their output terminals connected to a summing circuit that vectorially adds the outputs of the respective switches to provide a net filtered output.

Figure 4:
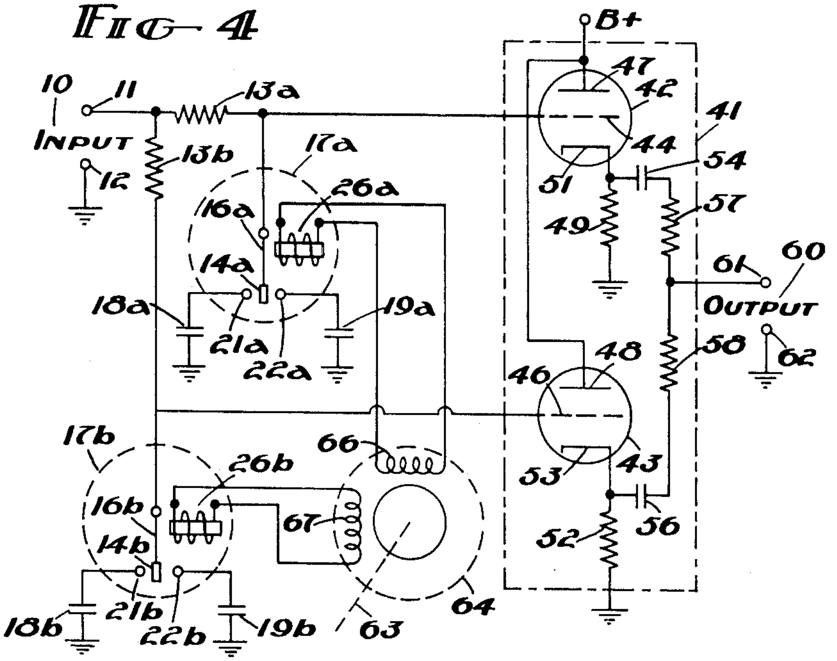
Figure 4 is a schematic diagram of one form of the invention.

One embodiment of the invention is shown in Figure 4, and it provides an output that is essentially unaffected by phase shift between the input signal and the switching frequency. A first resistor **13*a* of large value is connected between an input terminal 11 and the armature 16*a* of a first chopper 17*a*; and a second resistor 13*b* of equal value is similarly connected between terminal 11 and the armature 16*b* of a second chopper 17*b***.

A first pair of capacitors **18*a* and 19*a* are connected between ground and the respective contacts 21*a* and 22*a* of first chopper 17*a*, while a second pair of capacitors 18*b* and 19*b* are likewise connected between ground and the respective contacts 21*b* and 22*b* of second chopper 17*b*. The capacitors 18*a*, 19*a*, 18*b* and 19*b*** have substantially equal value.

A summation circuit 41 is provided that has a pair of high input impedance amplifiers to match the impedance of the switch outputs. It has a pair of tubes 42 and 43 connected as cathode followers with the grid 44 of tube 42 connected to armature **16*a*, and the grid 46 of tube 43 connected to the other armature 16*b*. The plates 47 and 48 of tubes 42 and 43 are connected to a suitable plate supply voltage, commonly called a B-plus supply. A cathode resistor 49 is connected between ground and the cathode 51 of tube 42, and another cathode resistor 52 of equal value is connected between ground and the cathode 53 of the other tube 43**.

A pair of blocking condensers 54 and 56 are connected on one side to cathodes 51 and 53, respectively, and a pair of resistors 57 and 58 are connected together at one end and are connected at their other ends to the other sides of capacitors 54 and 56, respectively. A pair of output terminals 61 and 62 are provided with terminal 62 connected to ground and terminal 61 connected to the common point of resistors 57 and 58 to provide the output vectorially summed in resistors 57 and 58.

Chopper armatures **16*a* and 16*b* are driven by chopper coils 26*a* and 26*b*, respectively; and a ninety degree phase relationship between the armatures is provided by maintaining the currents in the coils in ninety degree phase relationship. These phase relationships may be obtained by any of numerous phasing arrangements. Figure 4 shows one type of phasing method that may be obtained in an antenna nutation system. A shaft 63 is driven by the motor (not shown) which nutates the antenna, and hence shaft 63 rotates synchronously with the nutated signal frequency. A two-phase generator 64 is connected to shaft 63 and provides voltage outputs from coils 66 and 67 that are ninety degrees out of phase. Generator coils 66 and 67 are connected across chopper coils 26*a* and 26*b***, respectively, and the currents in the chopper coils will be ninety degrees out of phase when the impedances of the two circuits are equal, which may require adding impedance to one of them.

The combination in Figure 4 obtains the unusual result of eliminating the undesirable phase sensitivity that was characteristic of the filter of Figure 1. The removal of phase sensitivity is a function of the ninety degree phase relationship between choppers **17*a* and 17*b*** and may be explained mathematically with the aid of the circuit in Figure 1, as follows:

The output voltage of the circuit of Figure 1 may be explained by the formula, $$V_{out}=KV_{in}(\cos\theta)(\cos wt) \quad (1)$$

where $V_{out}$ is the instantaneous amplitude of the fundamental frequency component of the output voltage 28, $V_{in}$ is the peak value of the input signal 10, $\theta$ is the phase angle between the frequencies of chopper armature 16 and input signal 10, $w$ is $2\pi$ times the signal frequency, $t$ is time, and K is a proportionality constant.

It is noted in Equation 1 that output voltage $V_{out}$ goes to zero when the phase angle $\theta$ approaches ninety degrees, which is the out-of-phase condition described above in regard to Figures 3A, B and C. Thus, the output of the circuit is a maximum for a given amplitude of input signal when $\theta$ is zero, which signifies the in-phase condition described with the aid of Figures 2A, B, and C.

Continuing the mathematical analysis of the invention shown in Figure 4, the voltage provided to grid 44 by the chopper armature 16a may be represented mathematically by the following equation:

$$V_1=KV_{in}\cos\theta\cos wt \qquad (2)$$

where $V_1$ is the instantaneous amplitude of the fundamental frequency of the voltage received by grid 44, $V_{in}$ is the peak value of the signal input voltage 10, $\theta$ is the phase angle between the input signal 10 and the frequency of chopper armature 16a, $w$ is the frequency of the signal, $t$ is time, and K is a proportionality constant.

And the output from the other armature 16b is:

$$V_2=KV_{in}\cos(\theta+90^\circ)\cos(wt+90^\circ) \qquad (3)$$

where $V_2$ is the instantaneous amplitude of the fundamental frequency of the voltage received by grid 46, $V_{in}$ is the peak value of the signal input 10, $\theta$ is the same as in Equation 2 and hence $(\theta+90^\circ)$ is the phase angle between signal 10 and the frequency of armature 16b and thus is ninety degrees out of phase with the other chopper armature 16a, $wt$ is the same as in Equation 2 and $(wt+90^\circ)$ indicates that the voltage to grid 44 is ninety degrees out of phase with the voltage to grid 46, and K is the proportionality constant.

The outputs of choppers 17a and 17b are matched by the high input impedance amplifiers 42 and 43 and are added vectorially in summing circuit 41. Therefore the output of summing circuit 41 may be expressed by the formula $$V_t=V_1+V_2 \qquad (4)$$

where $V_t$ is the output voltage of summing circuit 41, $V_1$ is the instantaneous output of tube 42, and $V_2$ is the instantaneous output of tube 43.

When Equations 2 and 3 are substituted into Formula 4, the following expression is obtained, after algebraic and trigonometric manipulation:

$$V_t=KV_{in}\cos(wt+\theta) \qquad (5)$$

where the symbols are as explained above.

It is noted that the factor, $\cos\theta$, which caused output voltage to vary with phase and was prominent in Equation 1 for the synchronous filter in Figure 1, is absent from the Equation 5 which represents the output of the invention in Figure 4. Accordingly, the amplitude of the output of the invention does not vary with phase shift between the armature frequency and the signal frequency, provided that the two armatures maintain substantially a ninety degree phase relationship.

Figures 5, 6:
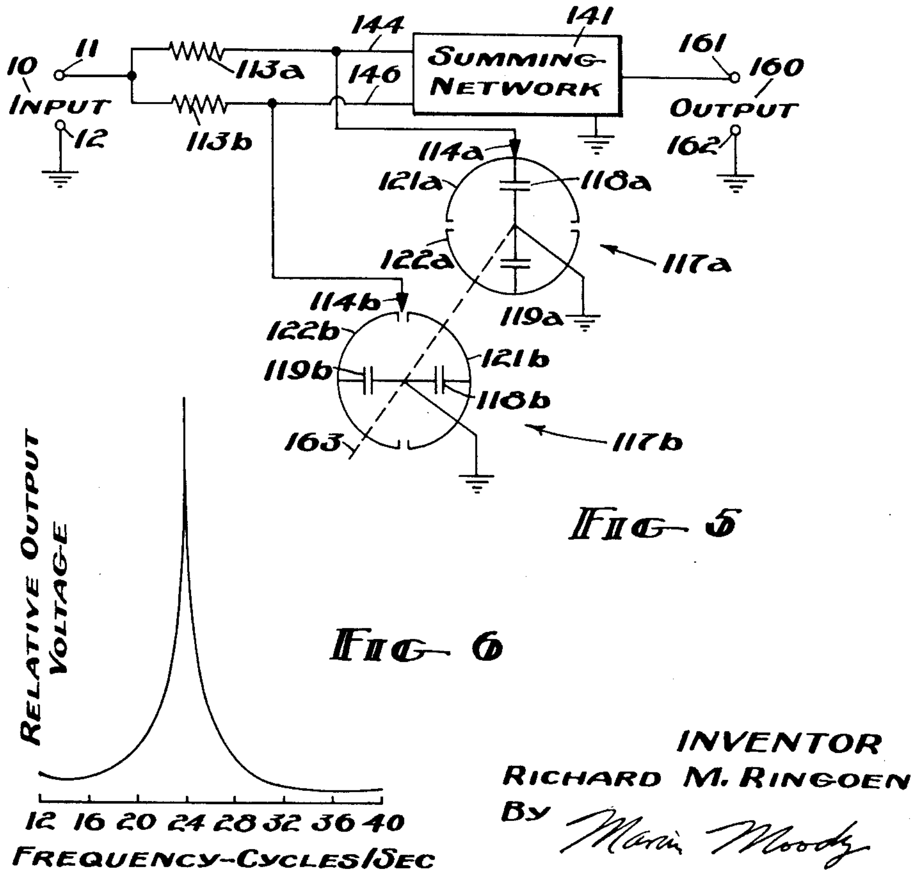
Figure 5 is a schematic diagram of another form of the invention.
Figure 6 illustrates the frequency response for a model of the embodiment shown in Figure 4.

A model of the apparatus shown schematically in Figure 4 was built, and it had a bandpass at the half power points of 0.03 cycle per second about a center frequency of 24 cycles per second with adjacent band attenuation of about 46 decibels. Its frequency response is indicated in Figure 6. The Q of the model was approximately 750 at 24 cycles per second.

The vibratory choppers shown in Figure 4 may be replaced with rotary type choppers or switches, such as switches 117a and 117b shown in Figure 5. Switch 117a has arcuate contacts 121a and 122a that are supported insulatingly from each other and also are fastened insulatingly to a shaft 163 which is grounded. Shaft 163 may, for example, be the nutating shaft used in conjunction with Figure 4. A pair of equal capacitors 118a and 119a are connected between shaft 163 and contacts 121a and 122a, respectively. A fixed contact 114a slideably and electrically engages the conducting surfaces of arcuate contacts 121a and 122a as they are rotated by shaft 163.

The other switch 117b also has a pair of arcuate contacts 121b and 122b which are likewise supported insulatingly from each other and are similarly fixed insulatingly to shaft 163. Likewise, a pair of equal capacitors 118b and 119b, which also are equal to capacitors 118a and 119a, are connected between shaft 163 and the respective contacts 121b and 122b, and a fixed contact 114b slideably and electrically engages the conducting surfaces of contacts 121b and 122b as they are rotated by shaft 163.

With respect to shaft 163, arcuate contacts 121a and 122a of switch 117a are positioned ninety degrees from arcuate contacts 121b and 122b of switch 117b; so that at the instant fixed contact 114a engages the center of either arcuate contacts 121a or 122a, fixed contact 114b of the other switch 117b is intermediate contacts 121b and 122b and engages neither of them. Hence, the rotary contacts maintain the same ninety degree phase relationship with each other that was provided the armatures of choppers 17a and 17b in Figure 4.

In Figure 5, input terminals 11 and 12, resistors 113a and 113b, and summing network 141 are the same as the corresponding designated items in Figure 4, which are designated without the prefix "1" used for similar items in Figure 5. Resistors 113a and 113b are connected between input terminal 11 and the fixed contacts 114a and 114b, respectively. Summing network 141 may be constructed similarly to network 41 in Figure 4 and has its inputs 144 and 146, which may be grids of the cathode follower tubes, connected to fixed contacts 114a and 114b, respectively. The output of network 141 is received across terminals 161 and 162 to provide output 160.

The electrical operation of the filter in Figure 5 is similar to the operation of the circuit of Figure 4. Hence, Equations 2 through 5 may be applied to the circuit in Figure 5.

The ninety degree phase relationship between switches 117a and 117b is mechanically provided in Figure 5 by their alignment on shaft 163, while in the circuit of Figure 4 the phase shift is provided electrically. The former is advantageous when a synchronously rotating shaft is available, since it always maintains a substantially perfect ninety degrees phase shift regardless of rotational velocity or change of velocity. In the case of Figure 4, the choppers may be located remotely from the rotating shaft, but any inequality in impedances of their respective circuits may become pronounced at certain frequencies and alter the ninety degree phase relationship, which for example might occur where it is desired to operate sequentially at a number of widely different synchronous frequencies.

It is thus apparent that this invention provides synchronous filter circuits which have outputs that are not substantially affected by variation of the phase between the signal frequency and the switching frequency. Furthermore, the invention maintains a very high Q and a very narrow bandpass; hence, the invention is capable of substantially improving the signal-to-noise ratio. It is peculiarly effective for filtering signals of subaudio frequency but is not so limited and may be used at any frequency, as long as the switching means remains synchronous with the signal, and the switching means maintains the above described ninety degree phase relationship. By using electronic switches of the type described in application No. 374,087 filed August 13, 1953, and assigned to applicant's assignor, instead of choppers or rotary switches, the invention may be used at radio frequencies.

While specific embodiments of the invention have been described, various changes and modifications will be obvious to those skilled in the art which do not depart from the spirit and scope of the invention as defined in the following claims.

What is claimed is:

1. A synchronous filter circuit that provides an output insensitive to phase shift between synchronous signal and switching frequencies comprising, a first synchronous filter having a single switching means, a second synchronous filter having a single switching means, the inputs of said filters connected to receive said signal, means providing a substantially ninety degree phase displacement between said synchronous switching means, and means for vectorially summing the outputs of said first and second filters.

2. A synchronous filter circuit insensitive to phase shift between synchronous signal and switching frequencies comprising, a pair of resistors connected at one end to receive said signal, a first switching means having an actuated member and a pair of separate conductive paths alternately connected by said actuating member, the actuating member of the first switching means connected to the other end of one of said resistors, a first pair of capacitors connected between ground and the respective conductive paths of said first switching means, a second switching means having an actuated member and a pair of separate conductive paths alternately connected by said actuated member, the second actuated member connected to the other end of the second of said resistors, a second pair of capacitors connected between ground and the respective conductive paths of said second switching means, means providing said actuated members with a substantially ninety degree phase relationship between them, and means for maintaining said actuated members synchronous with said signal.

3. A synchronous filter insensitive to phase shift between synchronous signal and switching frequencies comprising, first and second resistors connected at one end for receiving said signal, a first pair of capacitors with each connected to ground at one end, first means for switching the other end of said first resistor alternately between the remaining ends of said first pair of capacitors, a second pair of capacitors with each connected to ground at one end, second means for switching the other end of said second resistor alternately between the remaining ends of said second pair of capacitors, means for actuating said first and second switching means synchronously with said signal, means for phase displacing said switching means from each other by substantially ninety degrees, and means connected to the separated ends of said resistors to sum the signals provided at those ends to provide the output.

4. A phase insensitive synchronous filter for filtering an alternating signal provided at a pair of input terminals comprising, a first resistor connected at one end to the first of said input terminals, a second resistor of substantially equal value also connected at one end to the first of said input terminals, a first pair of capacitors each connected on one side to the second of said input terminals, a second pair of capacitors each connected on one side to the second of said input terminals, a first single-pole double-throw switch with its common member connected to the remaining end of said first resistor and its two alternate contacts connected respectively to the remaining ends of said first pair of capacitors, a second single-pole double-throw switch with its common member connected to the remaining end of said second resistor and its two alternate contacts connected respectively to the remaining ends of the second pair of capacitors, means for actuating both switches synchronously with said signal and providing a ninety degree phase relationship between said common members of said switches, whereby the summed output of said switches is insensitive to phase shift between the signal and the switching frequencies.

5. A phase insensitive synchronous filter for filtering an alternating signal and provided with a pair of input terminals comprising, a first resistor connected at one end to the first of said terminals, a second resistor connected at one end to the first of said terminals, a first switch having at least three contacts with at least two of the contacts alternately engaged by the third contact, the third contact of the first switch connected to the remaining end of the first resistor, a first condenser connected between the first contact of the first switch and the second input terminal, a second condenser connected between the second contact of the first switch and the second input terminal, a second switch having at least three contacts with at least two of the contacts alternately engaged by the third contact, the third contact of the second switch connected to the remaining end of the second resistor, a third capacitor connected between the first contact of the second switch and the second input terminal, a fourth capacitor connected between the second contact of the second switch and the second input terminal, the third contacts of both switches alternately engaging their first and second contacts in a manner synchronous with the alternating signal, said third contacts maintaining a substantially ninety degree phase relationship with each other but having any phase relationship with the signal, and a summing circuit with its input connected to both third contacts to provide a summed output.

6. A phase insensitive synchronous filter as in claim 5 wherein, the first two contacts of the first switch are rotary contacts and its third contact slideably engages the rotary contacts, the first two contacts of the second switch are rotary contacts and its third contact slideably engages the rotary contacts, a shaft axially fixed to the rotary contacts of both switches with the rotary contacts of the first switch displaced substantially ninety degrees from the rotary contacts of the second switch, and said shaft driven synchronously with the alternating signal.

7. A phase insensitive synchronous filter for filtering an alternating signal and having a pair of input terminals comprising, a pair of resistors connected together at one end which is connected to the first of the input terminals, a first chopper having a pair of fixed contacts alternately engaged by a vibrating contact that is connected to the remaining end of one of said pair of resistors and that is actuated by the chopper's coil, a first pair of capacitors each connected on one side to the second input terminal and each connected on the other side to a different fixed contact of said first chopper, a second chopper having a pair of fixed contacts alternately engaged by a vibrating contact that is connected to the remaining end of the other of said resistors and that is actuated by the chopper's coil, a second pair of capacitors each connected on one side to the second input terminal and each connected on the other side to a different fixed contact of said second chopper, two-phase generating means for providing two phases displaced by approximately ninety degrees and operating at a frequency synchronous with the alternating signal, the coil of said first chopper connected to the first phase, the coil of said second chopper connected to the second phase, and a summing circuit with its input connected to each of the vibrating contacts, whereby the summing circuit provides a filtered output that is not affected by phase difference between the signal and switching frequencies.

8. A phase insensitive synchronous filter for filtering an alternating signal received from a signal source comprising, a pair of resistors connected together at the first side of the signal source, a first chopper having a pair of fixed contacts alternately engaged by a vibrating contact that is connected to the remaining end of one of said pair of resistors and is actuated by the chopper coil, a first pair of capacitors each connected on one side to the second side of the signal source and each connected on the other side to a different fixed contact of said first chopper, a second chopper having a pair of fixed contacts alternately engaged by a vibrating contact that is connected to the remaining end of the other of said resistors and is actuated by the chopper coil, a second pair of capacitors each connected on one side to the second side of the signal source and each connected on the other side to a different fixed contact of said second chopper, a nutating shaft rotated synchronously with the alternating signal, a two-phase generator connected to said shaft to provide two separate voltage sources displaced by approximately ninety degrees of phase angle, the coil of said first chopper connected to the first phase, the coil of said second chopper connected to the second phase, and a summing circuit with its inputs connected to each of the vibrating contacts, whereby the summing circuit provides a filtered output that is not affected by phase difference between the signal and vibrating contacts.

9. A phase insensitive synchronous filter for filtering an alternating signal received from a signal source comprising, a pair of resistors connected together at one end to the first side of said signal source, a first chopper having a pair of fixed contacts alternately engaged by a vibrating contact that is connected to the remaining end of one of said pair of resistors and is actuated by the chopper's coil, a first pair of capacitors each connected on one side to the second side of the signal source and each connected on the other side to a different fixed contact of said first chopper, a second chopper having a pair of fixed contacts alternately engaged by a vibrating contact that is connected to the remaining end of the other of said resistors and is actuated by the chopper's coil, a second pair of capacitors each connected on one side to the second side of the signal source and each connected on the other side to a different fixed contact of said second chopper, two phase generating means for providing two phases displaced by approximately ninety degrees and operating at a frequency synchronous with the alternating signal, the coil of said first chopper connected to the first phase, the coil of said second chopper connected to the second phase, a first amplifier circuit with its high impedance input connected to the vibrating contact of said first chopper, a second amplifier circuit with its high impedance input connected to the vibrating contact of said second chopper, resistor means connected between the outputs of said amplifier, whereby a filtered output is obtained from an intermediate point on said resistor means.

10. A phase insensitive synchronous filter for filtering an alternating signal received across a pair of input terminals comprising, a pair of resistors connected together at one end to the first of the input terminals, a first chopper having a pair of fixed contacts alternately engaged by a vibrating contact that is connected to the remaining end of one of said pair of resistors, the coil of the first chopper actuating its vibrating contact, a first pair of capacitors each connected on one side to the second input terminal and each connected on the other side to a different fixed contact of said first chopper, a second chopper having a pair of fixed contacts alternately engaged by a vibrating contact that is connected to the remaining end of the other of said resistors, the coil of said second chopper actuating its vibrating contact, a second pair of capacitors each connected on one side to the second input terminal and each connected on the other side to a different fixed contact of said second chopper, two phase generating means for providing two voltages displaced by approximately ninety degrees of phase and operating at a frequency synchronous with the alternating signal, the coil of said first chopper connected to the first voltage, the coil of said second chopper connected to the second voltage, a first electron tube with its grid connected to the vibrating contact of said first chopper, a second electron tube with its grid connected to the vibrating contact of said second chopper, each of said tubes operably connected with a load resistance in its cathode circuit, a first blocking condenser with one of its ends connected to the cathode of said first tube, a second blocking condenser with one of its ends connected to the cathode of said second tube, a pair of resistors serially connected between the other ends of said blocking condensers, whereby a filtered output is received from an intermediate point on said resistors.

11. A phase insensitive synchronous filter for filtering an alternating signal received from a signal source comprising, first and second resistors connected at one end to the first side of said signal source, a shaft rotated synchronously with said signal, a first rotary switch having a pair of rotary contacts fixed to said shaft and a third contact slidably engaging the rotary contacts, the third contact of said first rotary switch connected to the other end of said first resistor, a first pair of condensers each connected on one side to the second side of the signal source and connected on the other side to a different rotary contact of said first switch, a second rotary switch having a pair of rotary contacts fixed to said shaft approximately ninety degrees from the rotary contacts of the first switch and a third contact slideably engaging the rotary contacts, the third contact of said second rotary switch connected to the other end of said second resistor, a second pair of condensers each connected on one side to the second side of the signal source and connected on the other side to a different rotary contact of said second switch, summing means with a pair of high impedance inputs connected to the respective third contacts, whereby a filtered output is received from said summing means and is not sensitive to phase shift between the signal and the synchronously rotating shaft.

References Cited in the file of this patent

UNITED STATES PATENTS 2,584,954 Williams -------------- Feb. 5, 1952